United States Patent Office.

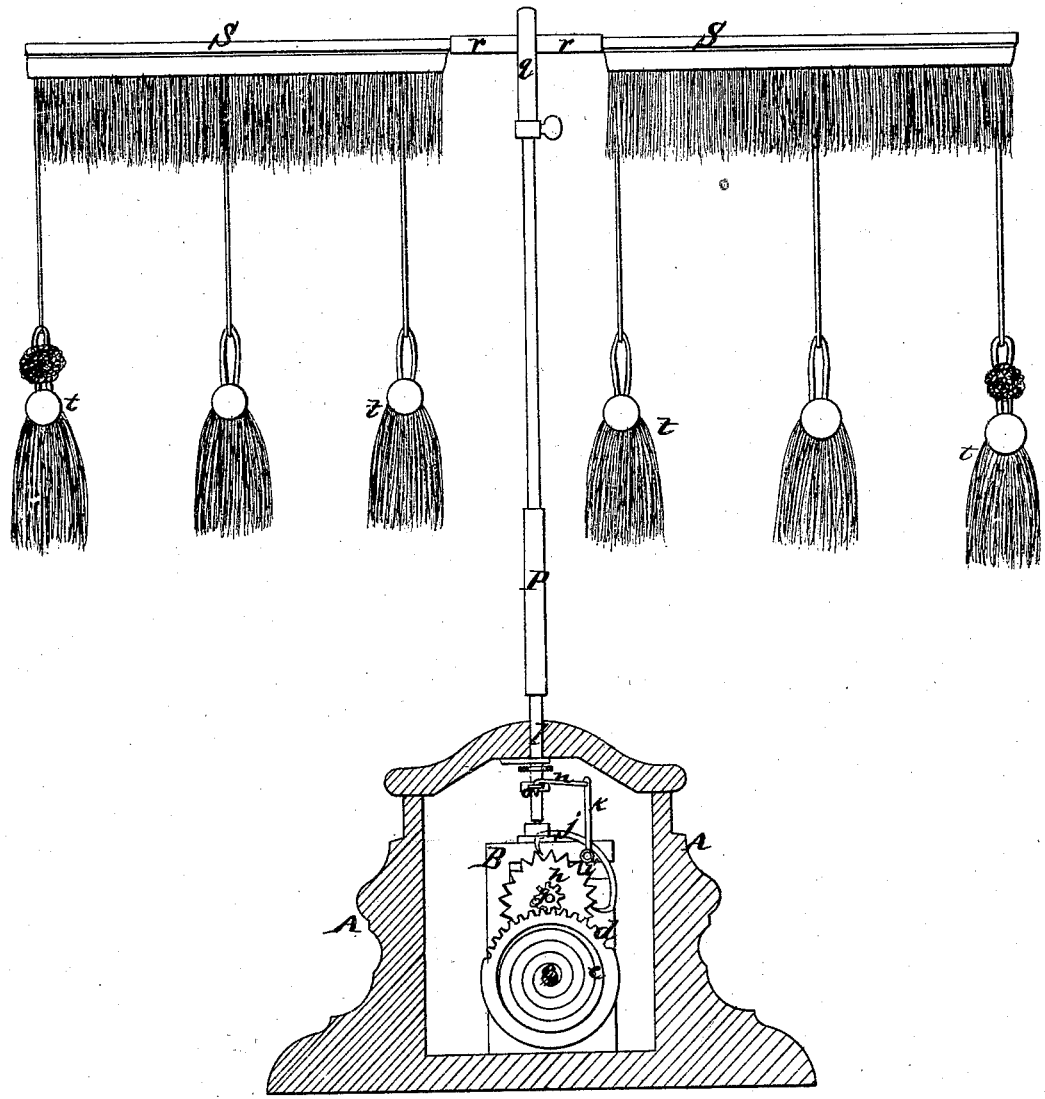

DAVID SHANKLAND AND EMERSON B. HOPKINSON, OF NEVADA CITY, CALIFORNIA.

Letters Patent No. 113,581, dated April 11, 1871.

IMPROVEMENT IN FLY-BRUSHES.

The Schedule referred to in these Letters Patent and making part of the same.

*To all whom it may concern:*

Be it known that we, DAVID SHANKLAND and EMERSON B. HOPKINSON, of Nevada City, county of Nevada, State of California, have invented an Improved Fly-Brush; and we do hereby declare the following description and accompanying drawing are sufficient to enable any person skilled in the art or science to which it most nearly appertains to make and use our said invention or improvements without further invention or experiment.

Our invention relates to an improved device for keeping a table or other locality free from flies, and we call it the "shoo-fly" machine.

It consists of an upright shaft, which is provided with two or more arms of flexible substance or material. A train of gears driven by a spring causes the upright shaft to make a semi-revolution back and forth each way, vibrating the arms and waving the streamers, thus dispersing and preventing the return of flies.

In order to more fully illustrate and explain our invention, reference is had to the accompanying drawing forming a part of this specification, in which—

A represents a stand or box of any desired size or pattern.

Inside of this box is placed a frame, B.

A shaft, c, extends across this frame and carries a toothed wheel, d.

A spring, e, is also coiled upon this shaft and serves to drive the train, being wound up by a suitable key, which is introduced through a hole in the box A.

A shaft, g, passes across the frame just above the wheel d, and carries a wheel, h, which is provided with large teeth, as shown.

A shaft, i, above this, carries a detent, j, which engages with the large teeth of the wheel h.

Secured to the shaft i is an arm, k, which is connected with the arm o on the vertical shaft l by a rod, n. The shaft l steps in a suitable bearing and rises through the top of the box A.

The rocking of the shaft i, upon which the detent is fixed when the spring is wound up, will cause the arm h to vibrate back and forth, and, through the rod n, give to the vertical shaft l a semi-revolution back and forth.

The upright rod or staff P is secured in some convenient manner to the upper end of the shaft l.

A tube, q, having two or more short radiating tubes, r, is arranged to slide up and down upon this staff and be fixed at any desired point.

Rods or arms, S, from which depend streamers, t, made of any pliant or flexible substance or material, have one end inserted in the tubes r, or are otherwise secured to them, so that when the shaft vibrates the arms will also be vibrated, causing the streamers to wave, thus keeping up a continual motion, which will drive away and prevent the approach of flies.

The arms S can be extended to any desired length, and thus protect a large table or other place which it is desired to free from flies.

Having thus described our invention,

What we claim, and desire to secure by Letters Patent, is—

A fly-brush, consisting of the train of gears driven by a spring, in combination with the vibrating-arm k, connected with the vertical shaft l by means of the connecting-rod n, and the vertical shaft P with its radiating-arms s, substantially as and for the purpose described.

In witness whereof we have hereunto set our hands and seals.

DAVID SHANKLAND. [L. S.]
EMERSON B. HOPKINSON. [L. S.]

Witnesses:
J. B. A. COLBY,
F. HOLLANDER.